R. Lanstrom.
Tip for Gas-Burner.
Nº 72741  Patented Dec. 31, 1867.
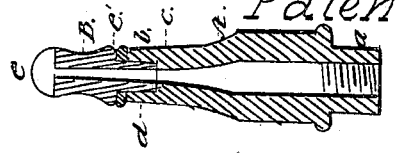
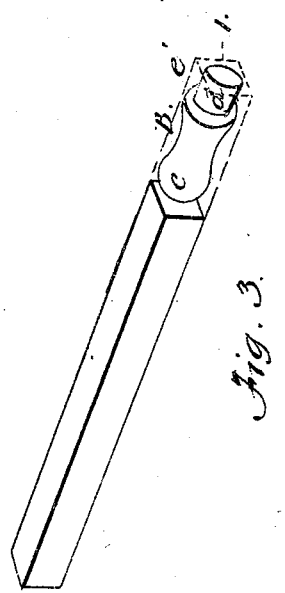
Fig. 3.
Attest;
Charles L. Fisher
John H Bogart
Fig. 1.
Reinhold Lanstrom

United States Patent Office.

REINHOLD LANSTROM, OF CINCINNATI, OHIO.

Letters Patent No. 72,741, dated December 31, 1867; antedated December 24, 1867.

IMPROVEMENT IN TIPS FOR GAS-BURNERS.

*The Schedule referred to in these Letters Patent and making part of the same.*

TO ALL WHOM IT MAY CONCERN:

Be it known that I, REINHOLD LANSTROM, of Cincinnati, Hamilton county, and State of Ohio, have invented a new and improved Tip for Gas-Burners, denominated Soapstone Tip for Gas-Burners, of which the following is a full and clear description, reference being had to the accompanying drawings, making part of this specification.

My invention relates to the application and construction of soapstone tips for gas-burners, whereby the uniform flow of gas is not liable to be checked, as is the case from corrosion in the iron or metal "tips."

Figure 1 is a perspective view of my improved "tip" detached from the stem of the burner.

Figure 2 represents a longitudinal section of a gas-burner, including my improved "tip," constructed of soapstone.

Figure 3 represents, in perspective, a bar of soapstone from which my improved "tip" is being formed.

A is the stem of an ordinary gas-burner, having a cylindrical opening longitudinally through its entire length. The large end $a$ is tapped to the gas-pipe. The smaller end $b$ has a socket, which terminates with the shoulder $c$. B indicates my improved tip, in shape similar to those made of metal or lava. The thread upon the neck $d$, usually met with in the metal tips, is dispensed with. The tip B is perforated to the bulb-end $e$, which is slotted. The neck $d$ is fitted securely in the socket of the small end $b$ of the stem, the shoulder $e'$ of the "tip" being brought into close contact with the extreme end $b'$, white lead or other suitable material being employed to "set" and "pack" the tip in its place.

In the manufacture of these "tips," I take, in the first place, a strip of the soapstone, square in section, as indicated in fig. 3, place it in a lathe, turn the tips from the strip, commencing at one end, as illustrated at 1 in fig. 3. The "tips" may be detached from the strip as rapidly as turned off by causing a rapidly-revolving saw to pass between them and the strip. Then, by means of a drill, the perforation from the neck-end to the bulb $e$ is rapidly performed. A thin disk-saw finishes the operation by slotting the bulb $e$, when the "tip" may be connected, as above described, with the shank of the burner.

The durability of the material of which I construct the "tip" strongly recommends it as an article of manufacture. Instead of being injured by the intense heat resulting from the combustion, the improved "tip" hardens, presenting a surface nearly as tough as steel.

What I claim as new, and of my invention, is—

1. The application of soapstone in the construction of tips for gas-burners, when constructed and applied substantially as above described and shown.

2. I claim a new article of manufacture in the soapstone tips for gas-burners herein described.

REINHOLD LANSTROM.

Witnesses:
A. V. STEWART,
CHARLES L. FISHER.